Dec. 2, 1969         R. H. WHITNEY         3,481,019
APPARATUS FOR INSERTING GASKETS IN BOTTLE CAPS
Original Filed Feb. 10, 1965         3 Sheets-Sheet 1
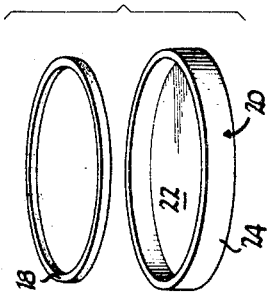
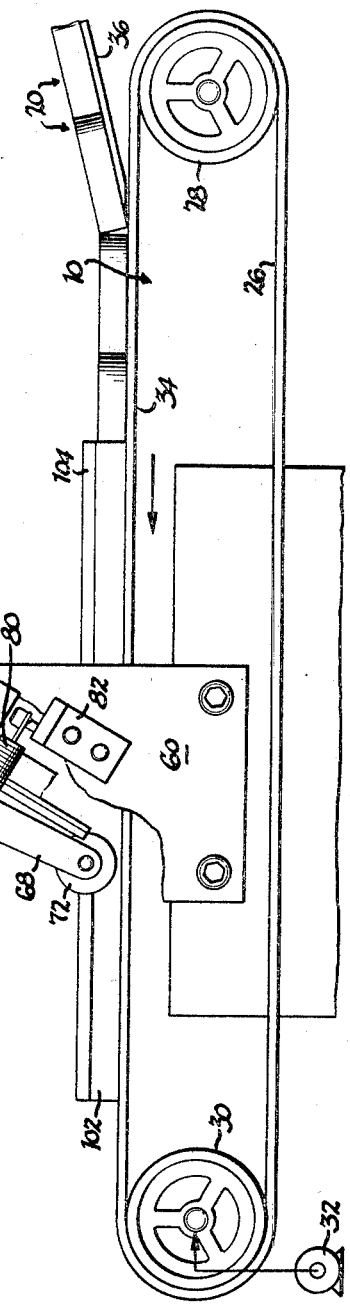
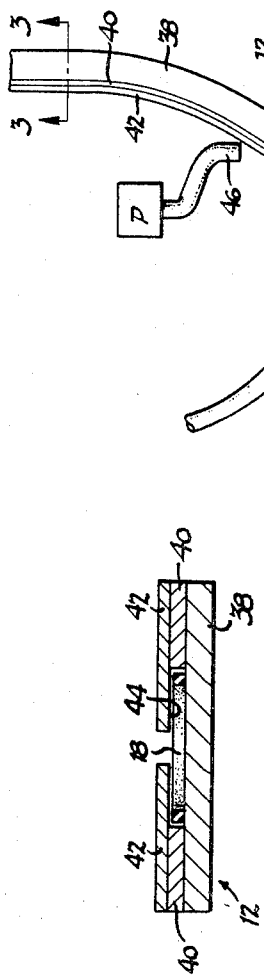
INVENTOR.
RALPH H. WHITNEY
BY
J. R. Nelson and
W. A. Scheich
ATTORNEYS INVENTOR.
RALPH H. WHITNEY
By J. R. Nelson and
W. A. Scheich
ATTORNEYS

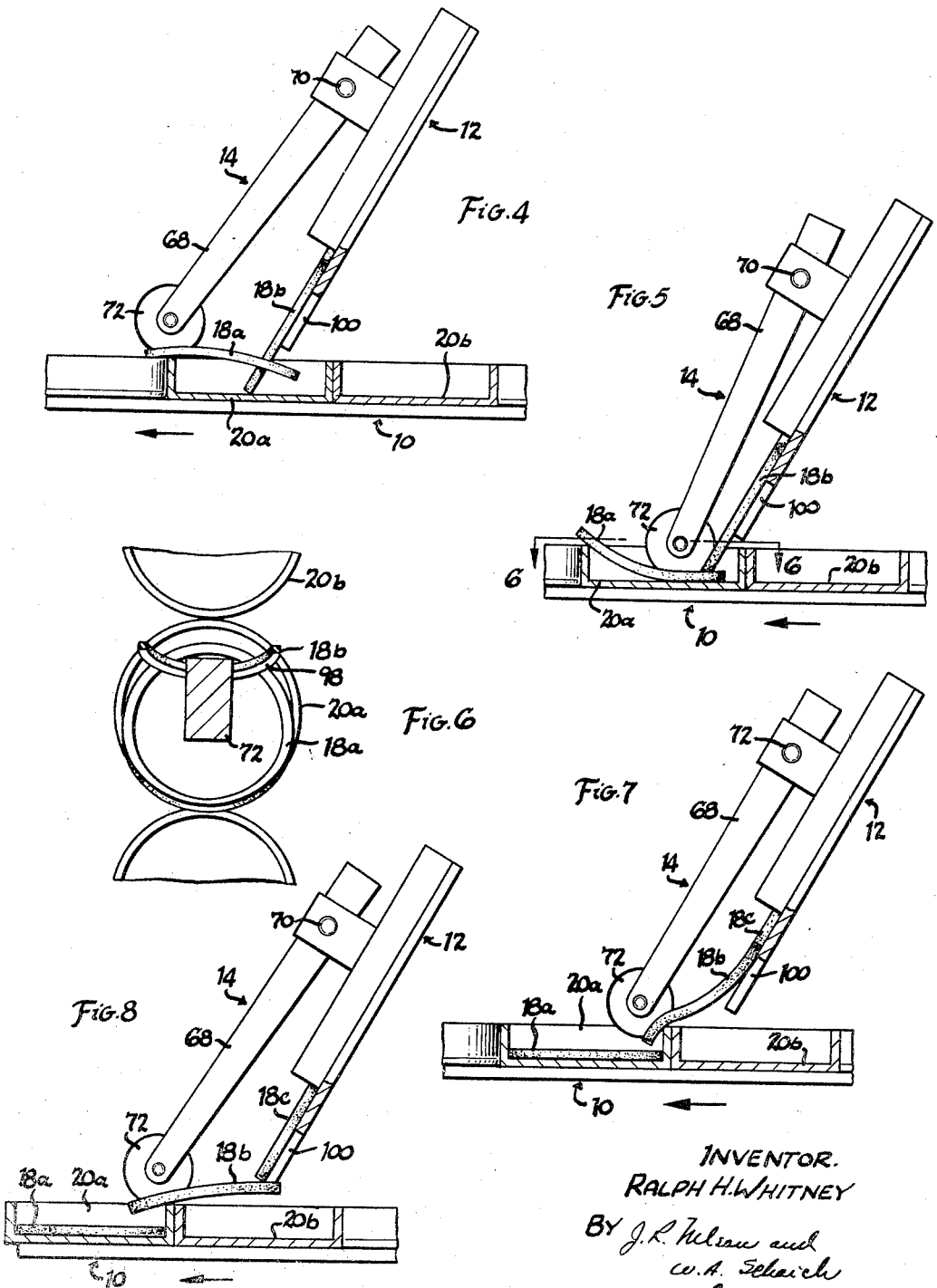

United States Patent Office 3,481,019
Patented Dec. 2, 1969

3,481,019
APPARATUS FOR INSERTING GASKETS IN
BOTTLE CAPS
Ralph H. Whitney, Glassboro, N.J., assignor to Owens
Illinois, Inc., a corporation of Ohio
Continuation of application Ser. No. 581,511, Sept. 23,
1966, which is a division of application Ser. No.
431,546, Feb. 10, 1965. This application Nov. 8, 1968,
Ser. No. 774,547
Int. Cl. B23p 19/04
U.S. Cl. 29—208
8 Claims

ABSTRACT OF THE DISCLOSURE

Apparatus is provided for inserting annular gaskets into bottle caps. The gaskets are fed edgewise through a chute overlying a conveyor which carries the caps in an inverted position. A trapping arm is mounted on the end of the chute and coacts with the closures and the gaskets to draw gaskets from the chute and insert them into the closures.

This application is a continuation of application Ser. No. 581,511, filed Sept. 23, 1966, now abandoned which is a division of application Ser. No. 431,546, filed Feb. 10, 1965, now Patent No. 3,302,278.

This invention relates to an apparatus for inserting annular gaskets into bottle caps.

Previously available machines for automatically inserting gaskets into bottle caps have not solved the problem of being able to consistently maintain successful operation at high output rates. As output rate requirements are increased, existing machines have been modified or refined in an attempt to increase their production rate. In general, the refinements and modifications have been in the form of increasingly complex mechanisms and controls. An increased output rate obviously calls for a higher degree of precision in synchronization of movement between parts, and as the number and complexity of parts increases, the problems of maintenance and adjustment likewise increase. In recent years, a point of no return appeared to have been reached in that further refinements or improvements to existing machines became self defeating. The number of adjustments required to properly set up the machine became so numerous that it was a practical impossibility to maintain all of the adjustments consistently accurate for any practical period of time. It was not uncommon to spend several weeks in adjusting, setting up, testing and re-adjusting a newly installed machine to bring the machine up to its rated production rate.

Probably the two most difficult problems encountered in previously employed machines of this type were the accurate synchronization of the feeding of caps and gaskets in accurately timed relationship to each other to the point at which the gasket was inserted and the handling of the gasket during the inserting operation.

Accordingly, it is one major object of the present invention to provide an apparatus for inserting gaskets into bottle caps which does not require a highly precise synchronization between the cap and gasket feeding movements.

It is another major object of the present invention to provide an apparatus for inserting gaskets into bottle caps at an extremely high production rate which is capable of being performed by a relatively simple mechanism requiring a minimum amount of adjustment.

Still another object of the invention is to provide an apparatus for inserting gaskets into bottle caps at high production rates in which the gasket is handled in a manner minimizing the possibility of tearing of the gasket.

Still another object of the invention is to provide an apparatus for inserting gaskets into bottle caps in which the feeding and insertion of the gaskets is controlled by the caps to achieve a self-synchronized inserting operation.

The foregoing, and other objects, are achieved in an operation in which a continuous line of bottle caps in inverted position is fed along a first path on a conveyor. Gaskets are fed edgewise down a vertically inclined path to a ready position at which a gasket is releasably held with its lower portion projecting downwardly into the interior of an inverted cap moving along a conveyor. A trapping mechanism, which may be conveniently in the form of a roller at the outer end of a pivot arm is swung through the central opening of a gasket in the ready position into contact with the trailing portion of the upwardly projecting skirt of the inverted cap on the conveyor. As the cap moves forwardly, the roller moves with the cap and eventually engages the lower end of the gasket. Continued movement of the cap and roller pulls the gasket from its releasable support by virtue of the trapping action of the roller and the gasket falls from the ready position into one in which its major portion is located in the interior of the next successive cap. As the caps move forwardly on the conveyor, the roller rides up the interior wall of the trailing portion of the skirt of the first cap, across the outwardly facing edge of the skirt and then swings downwardly about the pivot point of the roller supporting arm toward the trailing portion of the skirt wall of the next successive cap. Gaskets are fed both by gravity and air pressure so that as the roller swings toward the trailing portion of the next successive cap, a second gasket is in a ready position and the roller swing through the central opening of the second gasket toward the trailing skirt wall of the cap. This action also assists in moving the previous gasket toward its final seated position.

Other objects and features of the invention will become apparent by reference to the following specification and to the drawings.

In the drawings:

FIGURE 1 is a side elevational view with certain parts broken away, omitted or shown in section, of an apparatus embodying the present invention;

FIGURE 3 is a transverse cross-sectional view of the gasket delivery chute, taken on line 3—3 of FIGURE 1;

FIGURE 4 is a schematic side elevational view, partially in section, showing one step of the gasket inserting operation;

FIGURE 5 is a view similar to FIGURE 4 showing a subsequent stage of the gasket inserting operation;

FIGURE 6 is a detail cross-sectional view taken on line 6—6 of FIGURE 5;

FIGURE 7 is a view similar to FIGURE 5 showing a subsequent stage in the gasket inserting operation;

FIGURE 8 is a view similar to FIGURE 7 showing a subsequent stage of the gasket inserting operation; and FIGURE 9 is a perspective view of a cap and gasket.

Figure 2:
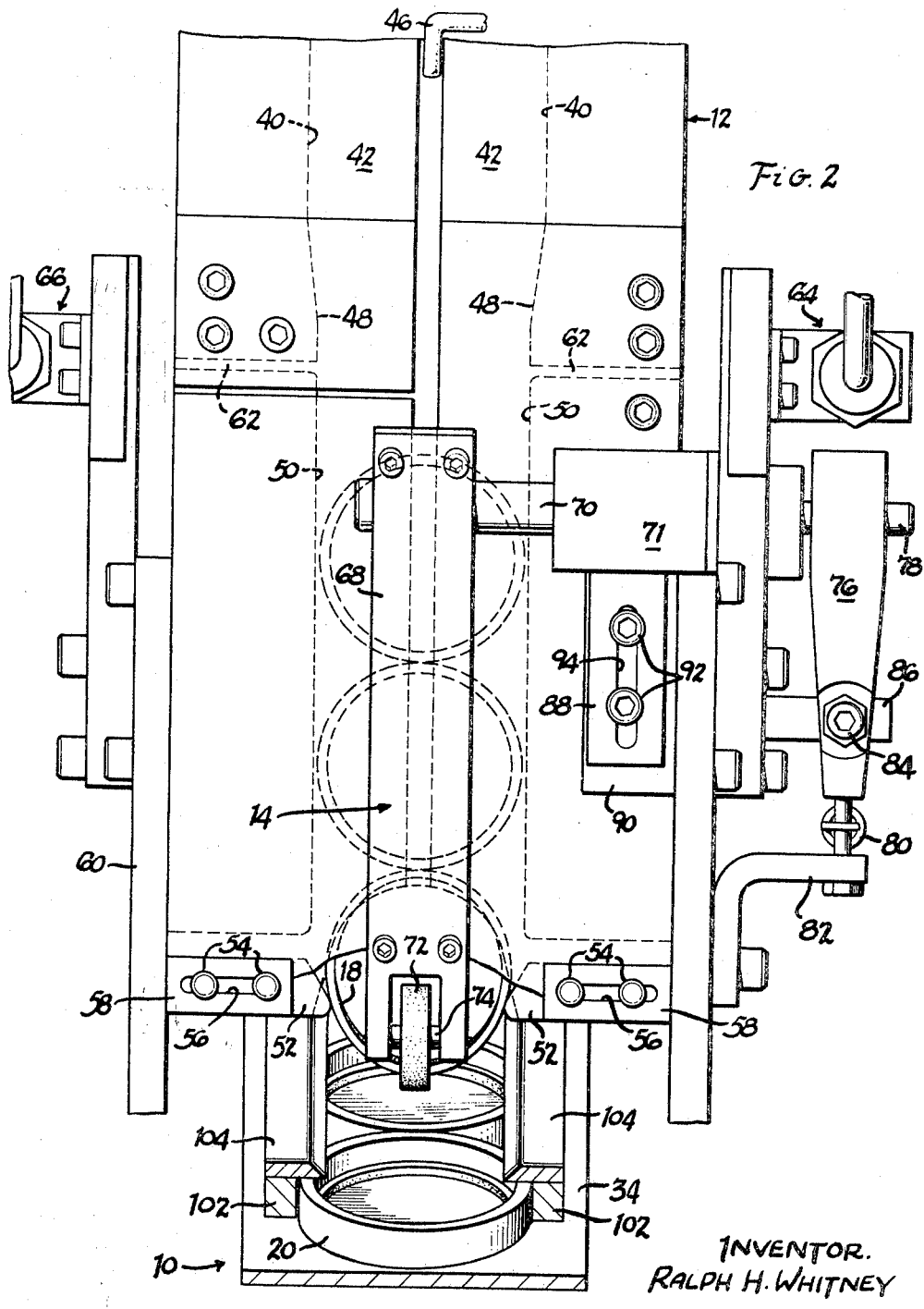
FIGURE 2 is a detail elevational view, partially in section, of the lower end of the gasket delivery chute of the apparatus of FIGURE 1.

Referring first to FIGURE 1, one exemplary form of apparatus embodying the invention includes as its three major components an endless belt conveyor designated generally 10 which is adapted to convey bottle caps to and from the gasket inserting station; a gasket delivery chute designated generally 12 through which gaskets are fed to the gasket inserting station, and a gasket trapping mechanism designated generally 14. For purposes of illustration, the machine shown in the drawings is shown inserting a plain, flat, annular gasket such as 18 (FIGURE 8) into a simple bottle cap 20 which consists of a flat top panel 22 formed with a depending annular skirt 24. It will be apparent from the following description that the invention is not limited for use solely with the simplified gasket and cap illustrated.

Bottle cap conveyor 10 includes an endless conveyor belt 26 which is operatively trained about a pair of end rolls 28 and 30, one of which is continuously driven, as by a drive motor 32, in a direction moving the upper run 34 of the belt from right to left as viewed in FIGURE 1. Bottle caps 20 in which gaskets are to be inserted are fed by any suitable means such as a chute 36 in a continuous line onto the upper run 34 of the conveyor. Caps 20 are fed onto conveyor 10 in an inverting position—i.e. open side up—and are advanced along conveyor 10 with the skirt portions of successive caps in contact with each other.

Gasket chute 12 is constructed basically, as best seen in FIGURE 3, with a bottom plate 38, spacers or side plates 40 and cover plates 42. The plates are fixedly secured to each other in the configuration shown in FIGURE 3 to define an internal gasket passage 44 the surfaces of which are preferably highly polished to exert a minimum amount of frictional resistance to the sliding movement of gaskets through the chute. As best seen in FIGURE 1, as viewed from the side the lower end of the chute is inclined at an angle of approximately 60°. Movement of gaskets downwardly through chute 12 is under the influence of both gravity and air pressure applied by a suitable number of air-jets from nozzles such as 46 connected to a suitable source of air under pressure such as P (FIGURE 1), the air-jets being directed against the gaskets through the central space between opposed cover plates 42.

Referring to FIGURE 2, it will be noted that the transverse spacing between side plates or spacers 40 is somewhat larger than the normal diameter of gasket 18 and that the inner edges of spacers 40 converge slightly as at 48 near their lower ends so that passage 44 is narrowed to approximately the normal outer diameter of gaskets 18. A second set of spacers 50 extend beyond the lower ends of spacers 40 to define a throat portion of the passage through which the gaskets pass to the lower end of chute 12. At the lower end of chute 12, a pair of abutment members 52 project into the gasket passage from opposite sides to define a stop which is normally operable to maintain the lowermost gasket 18 in a ready position at the lower end of chute 12. When in the ready position, the lowermost portion of the gasket projects outwardly beyond the lower end of the chute. Abutments 52 are supported within the chute for lateral adjustment by means of clamping screws 54 which are threaded into the abutments and project through longitudinal slots 56 in brackets 58 mounted in a fixed framework designated generally 60 which in turn is fixedly mounted with respect to the lower end of chute 12.

The spacing between the adjacent ends of spacers 40 and 50 provides a transverse cross-passage 62 which intersects gasket passage 44. An electric eye detecting unit including a light transmitter designated generally 64 and detector 66 are mounted in alignment with passage 62 to detect the presence of gaskets in the chute. In the event the supply of gaskets is interrupted, light from transmitter 64, which is normally blocked by the presence of a gasket in the chute in alignment with passages 62, is received at receiver 66 and the receiver is electrically connected to a suitable control mechanism to stop operation of bottle cap conveyor 10 until the gasket supply is replenished. It may also be desirable to locate a second electric eye unit (not shown) to detect the location of a gasket in the ready position, the absence of a gasket in the ready position indicating a jam in the gasket chute.

Gasket trapping mechanism 14 includes an elongate pivot arm 68 fixedly secured at one end to a pivot shaft 70 which is pivotally supported within a bearing 71 mounted upon frame 60. A trapping roller 72 is mounted in the distal end of arm 68 for free rotation upon a shaft 74 mounted in the lower end of arm 68.

Pivot shaft 70 projects entirely through bearing 71 and a biasing arm 76 is fixedly secured to an extension 78 of shaft 70. A tension spring 80 is coupled between the end of arm 76 and a fixed point defined by a bracket 82 on frame 60 so that shaft 70–78 and arm 68 are resiliently biased by spring 80 in a counterclockwise direction as viewed in FIGURE 1. Pivotal movement of arm 68 in the counterclockwise direction is limited by the engagement of an adjustable set screw 84 threaded into arm 76 which is engageable with a projection 86 on frame 60.

As best seen from a comparison of FIGURES 4 through 8, arm 68 projects downwardly from pivot shaft 70 to a position such that roller 72 extends into the interior of bottle caps conveyed on conveyor 10 when the arm is at its counterclockwise limit of pivotal movement determined by screw 84. Movement of bottle caps along conveyor 10 causes the arm to pivot as the skirt portion of the cap engages roller 72, the roller rolling up the sidewall over the skirt edge and then pivoting back downwardly into the interior of the next cap when the roller clears the cap skirt. In order to accommodate caps of different dimensions, bearing 71 in which pivot shaft 70 is mounted is supported for adjustment upon frame 60 by a bracket 88 upon which the bearing is fixedly mounted. Bracket 88 is slideable upon a platform 90 fixed to frame 60 and is clamped in selected positions of adjustment by clamping screws 92 which project through an elongate slot 94 in bracket 88.

The operating cycle is best shown in FIGURES 4 through 8. FIGURES 4, 5, 7 and 8 show successive steps in the operation in which the final steps of inserting a gasket 18a into a cap 20a are shown together with the steps of trapping and withdrawing a second gasket 18b and positioning the second gasket for insertion in a second cap 20b. In FIGURES 4, 5, 7 and 8, the bottle cap conveyor 10 is continuously moving to the left as viewed in these figures throughout the inserting operation.

In FIGURE 4, trapping roller 72 is shown at a point in the cycle at which it is passing over the upper edge of the leading portion of the skirt of cap 20a. At this time, roller 72 is located within the central opening of gasket 18a, preventing gasket 18a from moving rearwardly (to the right) with respect to cap 20a. The next successive gasket 18b is located in the ready position in contact with abutments 52 (FIGURE 2) with the lower portion of gasket 18b likewise projecting through the central opening of gasket 18a.

Referring now to FIGURE 5, cap 20a has been advanced from the FIGURE 4 position by bottle cap conveyor 10 to a position at which roller 72 has cleared the leading skirt edge of cap 20a. Arm 62 has pivoted about its pivot shaft 70 in a counterclockwise direction from the FIGURE 4 position under the influence of tension spring 80 (FIGURE 1). The lower right-hand quadrant of roller 72 as viewed in FIGURE 5 is beginning to enter the central opening in gasket 18b.

Referring to the cross-sectional view of FIGURE 6, at this time roller 72 is resting in contact with the front of the lower portion of gasket 18b, while gasket 18a is supported by cap 20a which is moving in the direction indicated by the arrow in FIGURE 6 by virtue of the movement of cap conveyor 10. This movement brings gasket 18a into contact with the rearward side of gasket 18b at points 98 to temporarily block forward movement of gasket 18a with its cap 20a to hereby urge gasket 18a rearwardly relative to cap 20a as the cap moves forwardly with its conveyor.

Referring now to FIGURE 7, cap 20a has been advanced by the conveyor 10 to a position in which the trailing portion of the skirt of cap 20a has moved into contact with roller 72 and roller 72 is in a process of rolling up the interior wall of the skirt. Arm 68 has pivoted about its shaft 70 in a clockwise direction from the FIGURE 5 position to accommodate this movement. Roller 72 contacts the cap skirt wall through the central opening of gasket 18b, thus trapping gasket 18b against the forwardly moving cap. The forward movement of the cap in FIGURE 7 is in the process of pulling gasket 18b free from the releasable support provided by abutments 52 to release gasket 18b from the chute. This action is assisted by the pressure exerted on gasket 18b by the following gaskets in gasket chute 12. It will be noted that gasket 18a is now in at least approximate position in the interior of cap 20a.

Referring now to FIGURE 8, bottle cap 20a has been advanced by conveyor 10 to a position at which roller 72 is just beginning to roll across the upper edge of the trailing skirt portion of cap 20a. Gasket 18b is now free of chute 12, the upper portion of the gasket having swung downwardly through a semi-circular opening 100 (see FIGURE 2) at the bottom of chute 12. Gasket 18c is closely following gasket 18b by virtue of the gravitational and air-jet forces applied to the line of gaskets within chute 12. Gasket 18b is still trapped by roller 72 and is constrained to move forwardly with the moving caps on conveyor 10.

In the next successive step, gaskets 18b and 18c assume the position of gaskets 18a and 18b respectively in FIGURE 4 and the above-described cycle is repeated.

From the foregoing description, it is believed apparent that it is desirable not only to accurately align the caps with the gasket chute, but also to provide a means for preventing roller 72 from tilting the caps on the conveyor. As the caps reach the inserting station they are guided on the surface of the conveyor belt by a pair of stationary side rails 102 which are mounted by suitable means upon frame 60. Side rails 102 confine the caps to a path of travel such that the path of movement of the cap centers lies in a vertical plane which also contains the path of movement of the centers of gaskets 18 in gasket chute 12. The caps are maintained in a flat position upon conveyor 10 by overhanging hold-down ledges 104 mounted upon side rails 102 and projecting inwardly from the respective side rails to overlie the opposite outer edges of the caps as they pass through the region in which the gasket is inserted.

The gasket readily passes downwardly between ledges 104, which are spaced from each other by a distance slightly less than the outer diameter of the gasket, because the lower portion of the gasket, when in its ready position, is located below the ledge. As the gasket is trapped and pulled from the chute, roller 72 maintains the leading portion of the gasket below ledges 104 and as the gasket moves forwardly with its cap, the gasket is drawn beneath the edges of the ledge. This action is further assisted by the downward force exerted on the released gasket by the movement of the next following gasket into the ready position at the bottom of the chute.

The machine described above is capable of being operated at speeds of 900 caps per minute. In view of the desirability of achieving as high a production rate as possible, it is necessary that pivot arm 68 and the entire pivoting assembly be as light as possible to permit the rapid swinging of the pivot arm between the position shown in FIGURES 4 and 5. To this end, pivot arm 68 is preferably constructed of a relatively light weight plastic material in order to minimize inertia.

At the relatively high production rates referred to above, the speed of operation of the apparatus is such that it is simply not possible to insure that each gasket is precisely inserted into its final position with a high degree of precision and thus, at high production rates, it may be desirable to pass the caps from the machine shown in the drawing through a gasket seating mechanism of conventional construction.

While one embodiment of the invention has been disclosed, it will be apparent to those skilled in the art that the disclosed embodiment may be modified. Therefore, the foregoing description is to be considered exemplary rather than limiting, and the true scope of the invention is that defined in the following claims.

I claim:

1. Apparatus for inserting annular gaskets into bottle caps having a top panel and a depending annular skirt comprising chute means for feeding gaskets edgewise downwardly along a vertically inclined path to a ready position wherein a gasket projects downwardly from the lower end of said chute means, a trapping element mounted for oscillating pivotal movement in an arc lying in a vertical plane and passing through the central opening of a gasket in said ready position, and means for feeding bottle caps in inverted position along a first path extending beneath the lower end of said chute means with the skirts of the inverted caps projecting upwardly above the lowermost portion of said arc.

2. Apparatus for inserting annular gaskets into bottle caps having a top panel and a depending annular skirt comprising chute means for feeding gaskets edgewise downwardly along a vertically inclined path to a ready position wherein a gasket projects downwardly from the lower end of said chute means, means for releasably supporting a gasket in said ready position, a pivot arm mounted at one end for oscillating pivotal movement about a horizontal axis located above the lower end of said chute means, trapping means at the other end of said arm for movement upon oscillation of said arm along an arcuate path lying in a vertical plane and passing through the central opening of a gasket in said ready position, and means for feeding bottle caps in inverted position along a first path extending beneath the lower end of said chute means with the skirts of the inverted caps projecting upwardly above the lowermost portion of said arcuate path and the centers of said caps traveling in said vertical plane.

3. Apparatus as defined in claim 2 wherein the path of movement of the centers of gaskets moving along said chute means also lies in said vertical plane, said inclined path and said first path converging at an acute angle.

4. Apparatus for inserting annular gaskets into bottle caps having a top panel and a depending annular skirt comprising chute means for feeding gaskets edgewise downwardly along a vertically inclined path to a ready position wherein a gasket projects downwardly from the lower end of said chute means, means for feeding bottle caps in inverted position along a first path extending beneath the lower end of said chute means with the skirts of the inverted caps projecting upwardly above the lowermost portion of a gasket in said ready position, and a pivot arm supported at one end for oscillating pivotal movement about a horizontal axis located above the lower end of said chute means, said arm projecting downwardly from said axis beyond the lower end of said chute means, roller means mounted on the lower end of said arm and projecting into the path of travel of the skirts of caps on said first path.

5. Apparatus for inserting annular gaskets into bottle caps having a top panel and a depending annular skirt comprising a gasket chute for feeding gaskets edgewise downwardly along a vertically inclined path to a ready position wherein a gasket projects downwardly from the lower end of said chute, conveying means for conveying bottle caps in inverted position along a horizontal first path extending beneath the lower end of said chute means with the skirts of the inverted caps projecting upwardly above the lowermost portion of said gasket, cap guiding means for maintaining caps on said conveying means in a horizontal position and in vertical alignment with gaskets in said chute, a trapping arm mounted upon said chute for pivotal oscillation about a horizontal axis normal to said first path and spaced upwardly above the lower end of said chute, a roller rotatably mounted on the lower end of said arm, means for locating said horizontal axis on said chute to cause said roller upon pivotal oscillation of said arm to move in an arcuate path above the top panels of inverted caps on said conveyor means wherein said roller is disposed above the cap skirts at one end of its arcuate path and below the cap skirts and above the lowermost portion of a gasket in said ready positon at the opposite end of said path, the skirts of said caps upon movement along said conveying means engaging said roller to pivotally oscillate said arm about said axis, and means biasing said arm toward said opposite end of said path.

6. The apparatus as defined in claim 1 wherein said chute is provided with an opening at said vertically inclined path, and further including a detector unit directed toward said opening to detect the absence of a gasket in alignment with said opening.

7. The apparatus as defined in claim 6 including control means for stopping said means for feeding bottle caps when the detector unit detects the absence of a gasket at said opening.

8. Apparatus for inserting annular gaskets into bottle caps having a top panel and a depending annular skirt comprising chute means for feeding gaskets edgewise downwardly along a vertically inclined path to a ready position wherein a gasket projects downwardly from the lower end of said chute means, detecting means associated with said chute for determining the presence or absence of gaskets in the chute, means for feeding bottle caps in inverted position along a path beneath the lower end of the chute, means for inserting a gasket into each cap as it passes beneath the chute and means actuatable by said detecting means for stopping the means for feeding said bottle caps upon the absence of gaskets in said chute.

References Cited

UNITED STATES PATENTS

| 2,386,797 | 10/1945 | Hohl et al. | 53—316 |
| 3,302,278 | 2/1965 | Whitney | 29—429 |

THOMAS H. EAGER, Primary Examiner

U.S. Cl. X.R.

29—429; 53—316